United States Patent
Thompson et al.

(10) Patent No.: US 7,381,633 B2
(45) Date of Patent: Jun. 3, 2008

(54) METHOD OF MAKING A PATTERNED METAL OXIDE FILM

(75) Inventors: John O. Thompson, Albany, OR (US); Curt Lee Nelson, Corvallis, OR (US); David Punsalan, Eugene, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 371 days.

(21) Appl. No.: 11/044,424

(22) Filed: Jan. 27, 2005

(65) Prior Publication Data

US 2006/0166537 A1    Jul. 27, 2006

(51) Int. Cl.
*H01L 21/44* (2006.01)
(52) U.S. Cl. ............... 438/608; 438/658; 257/E21.174
(58) Field of Classification Search ............... 438/608, 438/658, 699, 782; 257/E21.174
See application file for complete search history.

(56) References Cited

U.S. PATENT DOCUMENTS

| | | | |
|---|---|---|---|
| 4,704,299 A | | 11/1987 | Wielonski et al. |
| 4,874,462 A | * | 10/1989 | Makita et al. ............... 216/55 |
| 4,997,809 A | | 3/1991 | Gupta |
| 5,100,764 A | | 3/1992 | Paulson et al. |
| 5,271,797 A | | 12/1993 | Kamisawa |
| 5,605,723 A | * | 2/1997 | Ogi et al. ............... 427/533 |
| 5,627,013 A | | 5/1997 | Kamisawa |
| 5,630,872 A | | 5/1997 | Ogi et al. |
| 5,942,376 A | | 8/1999 | Uchida |
| 5,965,219 A | | 10/1999 | Hayashi et al. |
| 6,013,334 A | | 1/2000 | Kamisawa |
| 6,171,645 B1 | | 1/2001 | Smith et al. |
| 6,180,186 B1 | | 1/2001 | Choy et al. |
| 6,517,901 B1 | | 2/2003 | Minami |
| 6,576,302 B1 | | 6/2003 | Mizuta et al. |
| 2002/0123176 A1 | * | 9/2002 | Izumi et al. ............... 438/149 |
| 2002/0192392 A1 | | 12/2002 | Blanton |
| 2003/0138697 A1 | | 7/2003 | Leising et al. |
| 2004/0191423 A1 | | 9/2004 | Ruan et al. |

FOREIGN PATENT DOCUMENTS

JP    09 157855    6/1997

* cited by examiner

*Primary Examiner*—Trung Dang

(57) ABSTRACT

A method of making a patterned metal oxide film includes jetting a sol-gel solution on a substrate. The sol-gel solution is dried to form a gel layer on the substrate. Portions of the gel layer are irradiated to pattern the gel layer and to form exposed portions. Irradiation causes the exposed portions of the gel layer to become at least one of substantially condensed to an oxide, substantially densified, substantially cured, and combinations thereof. The unexposed portions of the gel layer are removed, thereby forming the patterned metal oxide film.

24 Claims, 3 Drawing Sheets

METHOD OF MAKING A PATTERNED METAL OXIDE FILM

BACKGROUND

The present disclosure relates generally to metal oxide films, and more particularly to a method of making a patterned metal oxide film.

Metal oxide structures are often used in devices having electronic circuitry. Current techniques for processing metal oxide structures may include multiple steps, such as, for example, depositing an oxide, masking a pattern, etching the pattern, removing the mask, and cleaning the surface. In some processes, patterning the metal oxide structures includes both vacuum deposition and lithographic processes. Such processes may, in some instances, be time consuming and expensive. Further, many processing techniques use acid or plasma during etching of the patterned material. However, such processing techniques may have a potential to dissolve or etch other materials below or adjacent to the oxide being etched. As such, multiple layered structures may be difficult to manufacture.

Conventional processes for forming patterned metal oxide structures may include multiple, time-consuming steps, costly equipment, and/or substantially difficult etching processes. As such, there is a need for a method of making a patterned film in fewer processing steps that are less time consuming and that use less costly equipment. Further, there is a need for a method of making a patterned film having multiple layers such that the etching step substantially avoids undesirable destruction of the lower layers.

SUMMARY

A method of making a patterned metal oxide film is disclosed. The method includes jetting a sol-gel solution on a substrate. The sol-gel solution is dried to form a gel layer on the substrate. Portions of the gel layer are irradiated to pattern the gel layer and form exposed portions of the gel layer. Irradiation causes the exposed portions of the gel layer to become at least one of substantially condensed to an oxide, substantially densified, substantially cured, and combinations thereof. The unexposed portions of the gel layer are removed, thereby forming the patterned metal oxide film.

BRIEF DESCRIPTION OF THE DRAWINGS

Objects, features and advantages of embodiments of the present disclosure will become apparent by reference to the following detailed description and drawings, in which like reference numerals correspond to similar, though not necessarily identical components. For the sake of brevity, reference numerals having a previously described function may not necessarily be described in connection with subsequent drawings in which they appear.

DETAILED DESCRIPTION

Embodiment(s) of the method as disclosed herein may be used to form patterned metal oxide films that may be used in a variety of devices, including those devices having electronic circuitry. Embodiments of the method allow the patterning to occur either without the use of, or limited use of, vacuum or lithographic processes. Further, embodiment(s) of the method include etching solutions and processes that advantageously do not deleteriously affect oxides, metals, or other material(s) (non-limitative examples of which include nitrides, selenides or sulfides) that are present in the film or on a substrate upon which the film is formed.

Figure 1:
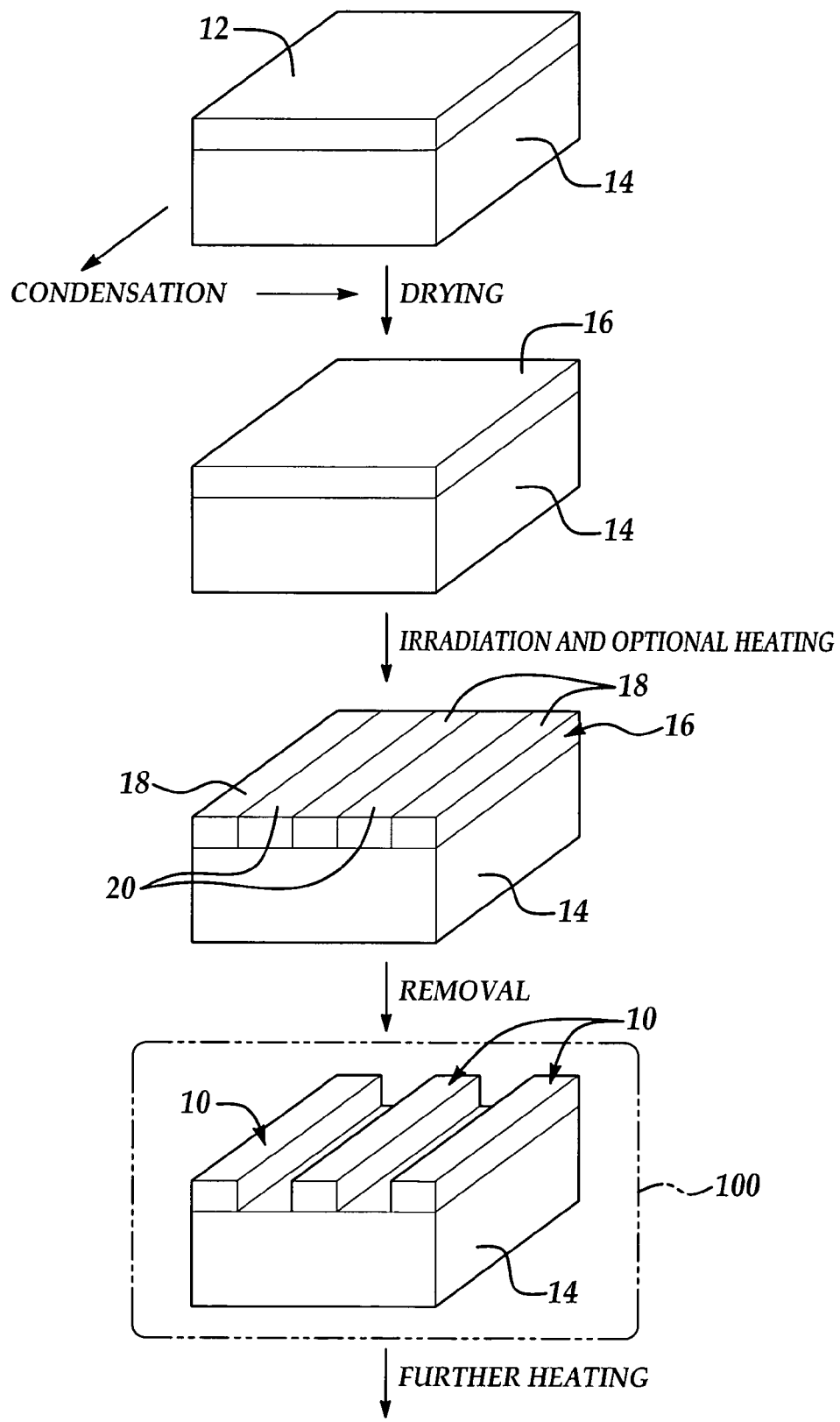
FIG. 1 is a schematic perspective flow diagram of an embodiment of a method of forming an embodiment of the patterned metal oxide film.

Referring now to FIG. 1, an embodiment of the method of forming a patterned metal oxide film 10 is shown. The patterned metal oxide film 10 may be used as conducting oxides, transparent conducting oxides, semiconducting oxides, transparent semiconducting oxides, dielectric oxides, insulators, or combinations thereof in a device 100.

A sol-gel solution 12 is established, via a jetting technique, on a substrate 14. It is to be understood that the substrate 14 may be formed from any suitable material, including materials having solid surfaces. Examples of such materials, include, but are not limited to silicon, single crystal silicon, polycrystalline silicon, silicon oxide containing dielectric substrates, alumina, sapphire, ceramics, cermets, metals, glasses, polymers, and/or mixtures thereof. The substrate 14 may also include additional layers (not shown) that are established thereon prior to the establishment of the sol-gel solution 12. Examples of such additional layers include layers of oxide, silicon nitride, silicon carbide, anodized metals (non-limitative examples of which include tantalum and aluminum), and combinations thereof. It is to be understood that the additional layer(s) may have any suitable thickness. One non-limitative example of such a layer is a thermally grown oxide layer having a thickness ranging between about 2 nm and about 2000 nm, and in particular may have a thickness of about 1000 angstroms (100 nm).

Prior to the establishment of the sol-gel solution 12 on the substrate 14, the method includes forming the sol-gel solution 12. The sol-gel solution 12 includes one or more metal alkoxides, such as, for example, zinc isopropoxide or tin t-butoxide in an anhydrous solvent, such as, for example, an alcohol. It is to be understood that the metal alkoxides may be formed from metal organic precursors (non-limitative examples of which include metal acetates), metal salts, and the like, or may be purchased commercially.

The sol-gel solution 12 may include an alkoxide or alkoxyalcoholate composed of one or more alkoxy groups and one or more elements. Non-limitative examples of the alkoxy groups include butanol, butoxyethanol, ethanol, ethoxyethanol, isopropanol, isobutanol, methanol, methoxyethanol, propanol, propoxyethanol, t-butanol, and/or any other appropriate organic group(s) capable of complexing with one or more of the following elements through an organic oxygen linkage. Examples of the elements include, but are not limited to aluminum, arsenic, antimony, bismuth, barium, beryllium, boron, calcium, cadmium, cerium, cesium, chromium, cobalt, copper, europium, gadolinium, gallium, germanium, hafnium, holmium, iron, indium, lanthanum, lead, lithium, manganese, neodymium, niobium, nickel, potassium, platinum, palladium, praseodymium, rubidium, rhodium, ruthenium, sodium, selenium, strontium, scandium, tantalum, titanium, tin, tellurium, terbium, thorium, vanadium, ytterbium, zirconium, zinc, and mixtures thereof.

The metal alkoxides may be substantially homogeneously and/or substantially heterogeneously mixed throughout the anhydrous solvent. Further, the solution 12 may be refluxed, if desired, to ensure mixing of the alkoxide in the solvent. Further, the sol-gel solution 12 may include any complexing agent(s), additional solvent(s), and/or combinations thereof desirable for salvation.

It is to be understood that forming the sol-gel solution 12 may be performed outside the presence of water in order to substantially prevent water from contacting the solution 12. Contact with water may cause condensation and create potentially undesirable metal oxygen polymer chains. Various metal alkoxides have different reaction rates, and partial condensation may lead to heterogeneous regions composed of the more reactive metal. An embodiment of the method of forming the sol-gel solution 12 disclosed herein (outside the presence of water) is in contrast to the typical aging processes used to pre-react sol-gels to form oligomers that are generally used for spin coating or dip coating applications.

As indicated in an embodiment, once the sol-gel solution 12 is formed, it is established on the substrate 14 via a jetting technique. Any suitable jetting technique may be used, and in general, the jetting technique includes drop generating technology.

A non-limiting example of suitable drop generating technology includes an ejector head having one or more drop generators, which include a drop ejector in fluid communication with one or more reservoirs, and at least one orifice through which the discrete droplet(s) is eventually ejected. The elements of the drop generator may be electronically activated to release the fluid drops. It is to be understood that the drop generators may be positioned as a linear or substantially non-linear array, or as an array having any two dimensional shape, as desired.

An electronic device or electronic circuitry may be included in the ejector head as thin film circuitry or a thin film device that defines drop ejection elements, such as resistors or piezo-transducers. Still further, the electronic device may include drive circuitry such as, for example, transistors, logic circuitry, and input contact pads. In one embodiment, the thin film device includes a resistor configured to receive current pulses and to thermally generate bubbles in response thereto. In another embodiment, the thin film device includes a piezo-electrical device configured to receive current pulses and to change dimension in response thereto.

It is to be understood that the electronic device or circuitry of the ejector head may receive electrical signals and in response, may activate one or more of the array of drop generators. Each drop generator is pulse activated, such that it ejects a discrete droplet in response to receiving a current or voltage pulse. Each drop generator may be addressed individually, or groups of drop generators may be addressed substantially simultaneously. Some non-limitative examples of drop generating technology include continuous inkjet printing techniques and/or drop-on-demand inkjet printing techniques. Suitable examples of continuous inkjet printing techniques include, but are not limited to thermally, mechanically, or electrostatically stimulated processes, and/ or combinations thereof, with electrostatic, thermal, or acoustic deflection processes, and/or combinations thereof. Suitable examples of drop-on-demand inkjet printing techniques include, but are not limited to thermal inkjet printing, acoustic inkjet printing, piezo electric inkjet printing, and combinations thereof.

It is to be understood that precision jetting is unnecessary, as the blanket coat of the sol-gel solution 12 is patterned at a later time. It is to be further understood that the sol-gel solution 12 may be jetted such that it has any suitable thickness. Generally, the sol-gel solution 12 includes between about 1% and about 2% alkoxide, and the remainder is solvent. As a substantial amount of the solvent is removed, sol-gel solution 12 thickness, gel layer 16 (described hereinbelow) thickness, and the final oxide layer thickness may be significantly different from each other. In an embodiment, the gel layer 16 may shrink by a factor of about 4 to about 8 upon conversion to an oxide. In one non-limitative example, the gel layer 16 thickness ranges from about 20 angstroms to several microns (e.g. 2 μm); and, in another non-limitative embodiment, it ranges between about 500 angstroms and about 3000 angstroms. It is to be understood that the thickness of the sol-gel solution 12 may be thicker than the gel layer 16 as the sol-gel solution 12 tends to dry to the gel layer 16 rapidly.

Jetting the sol-gel solution 12 (generally an un-reacted alkoxide solution) on the substrate 14 may substantially eliminate problems that may be associated with spin and dip coating techniques. As previously stated, spin and dip coating of metal alkoxide solutions generally calls for pre-reaction to form metal-oxygen oligomers that may adhere to a surface. This pre-reaction will favor the more reactive metal alkoxide, thereby forming localized regions of that particular component. In contrast, the sol-gel solution 12 deposited via jetting dries substantially rapidly and reacts with water vapor in the ambient air or other gas, thereby possibly eliminating potentially problematic premature chemical reactions experienced with spin and dip coating.

It is to be understood, however, that when such premature chemical reactions are not problematic and/or the precursor may be economically globally applied to the substrate, the other techniques such as spin or dip coating may be a viable means of applying the sol-gel solution. Deposition techniques other than jetting, such as spin and dip coating, may be used in embodiments disclosed herein that do not include non-reacted alkoxide(s) in the sol-gel solution 12. This is due, at least in part, to the fact that reacted alkoxides will adhere during spin/dip coating.

After the sol-gel solution 12 is established onto the substrate 14, the solvent in the sol-gel solution 12 tends to rapidly evaporate (e.g. a few seconds), thereby leaving the alkoxide(s) and initially forming the gel layer 16. At this point, the method optionally includes condensing the alkoxide(s). Exposing the alkoxide(s) to water vapor allows the metal alkoxides to cross link, thereby forming a strong three-dimensional network of metal oxygen bonds. Without being bound to any theory, it is believed that allowing the alkoxide(s) to undergo condensation may advantageously create a stable structure and allow the additional loss of organic molecules from the solution 12 which may be trapped in later processing.

After the solution 12 is jetted onto the substrate 14, the solution 12 either substantially dries or forms a cross-linked gel. Before the solution dries to form the gel/residue 16, it acts as an organic solvent. It is to be understood that "dry, dries, drying, and dried," means that the solution desolvates enough to form a stable structure. It is to be further understood that if the solution remains a liquid, it may dewet from the surface and gather on a single area of the substrate. Substantial drying allows excess solvent to be removed from the solution 12, thereby densifying the solution 12 into the gel layer 16. Drying the solution 12 may be accomplished at any suitable moderate temperature. In an embodiment, drying is accomplished at a temperature ranging between about 25° C. and about 130° C. In a non-limitative example, the sol-gel solution 12 is dried at about 80° C. for about two minutes. It is to be understood, however, that the temperatures and times for drying may be adjusted for the particular metal alkoxides that are selected for the sol-gel solution 12. It is to be further understood that excessive heating leads to a material that is insoluble during the etching process.

In an embodiment of the method, predetermined portions 18 of the gel layer 16 are then exposed to irradiation to pattern the gel layer 16. This may be accomplished by directing a light source (a non-limitative example of which includes an ultraviolet laser) through a shadow mask (not shown). It is to be understood that the shadow mask may have any pattern (non-limitative examples of which include stripes, any regular geometric shapes, any non-regular geometric shapes, alphanumerics, graphics, interdigitated lines, images, and combinations thereof) that may be desirable for the patterned metal oxide film 10. In an embodiment, the shadow mask pattern has features as small as about 0.05 μm. As such, the final patterned metal oxide film 10 may have features as small as about 0.05 μm in width. In an example embodiment, the feature size ranges between about 2.5 μm and about 100 μm.

It is to be understood that the feature size may be as large as desirable. Generally, the feature size is determined, at least in part, by the fluence, wavelength range, and/or optics of the irradiating instrument (a non-limitative example of which is a laser).

In an alternate embodiment, irradiating portions (exposed portions 18) of the gel layer 16 to light is accomplished by focused exposure through optics forming a beam. It is to be understood that the beam is directed at the exposed portions 18, leaving portions 20 of the gel layer 16 unexposed.

In the embodiment(s) of the method disclosed herein, the irradiating light source may be of any suitable wavelength range that is capable of being absorbed by the exposed portions 18 of the gel layer 16. Non-limitative examples of such wavelengths include those in the ultraviolet, visible, and infrared spectrum. Non-limitative examples of irradiation sources include ultraviolet excimer lasers operating at 193 nm, 248 nm, or 308 nm; Nd:Yag lasers operating at 355 nm, 532 nm, or 1064 nm; or carbon dioxide lasers operating between about 9.6 μm and about 10.6 μm.

Exposing certain portions of the gel layer 16 to the radiation forms exposed portions 18 and unexposed portions 20 of the gel layer 16. It is to be understood that the exposed portions 18 are heated by the light source, and that such heating may substantially condense the gel layer 16 to a metal oxide, substantially densify the gel layer 16, substantially cure the gel layer 16, and/or combinations thereof. It is to be further understood that the fluence of the light source may be set low enough to condense regions of the gel layer 16, thereby preventing later removal. It is to be understood that further heating is used to form the final oxide film 10. The selection of the light source fluence depends, at least in part, on the material composing the gel layer 16, how well the material absorbs photons, and how reactive the material is. In an embodiment, fluences as low as about 1 mJ/cm$^2$ may be used to condense the gel layer 16 with tens of thousands of pulses from the laser. However, it is to be understood that laser fluence over about 50 mJ/cm$^2$ may ablate the gel layer 16 surface.

It is to be further understood that the power of the light source may be set to initiate densification and curing of the exposed portions 18. Irradiation may also include programmed heating profiles to rapidly heat and cool the exposed portions 18. Quenching may form an amorphous material, and slower cooling may form a crystalline material.

In an embodiment, the gel layer 16 may be heated by an external heat source substantially simultaneously with the irradiation of the exposed portions 18 of gel layer 16. This additional heating may be accomplished via conductive, convective, and/or radiative heat sources such that the entire substrate is substantially evenly heated. In an embodiment, the external heating source is a hot plate. It is to be understood that the external heating may be at a temperature that is below the reaction temperature of the gel layer 16 material. Further, the time that the gel layer 16 is exposed to the external heat may depend, at least in part, on the material(s) used. The combination of the external heating and irradiation, e.g. laser generated energy, may initiate the densification or crystallization of the exposed portions 18. Without being bound to any theory, it is believed that the external heating, in addition to laser generated energy, may substantially reduce the number of laser pulses and laser energy or fluence used to begin condensing the exposed portions 18 of the gel layer 16.

The unexposed portions 20 of the gel layer 16 are susceptible to removal. Removal may be accomplished via any suitable technique. In an embodiment, the removal is caused by exposing the gel layer 16 (both exposed and unexposed portions 18, 20) to an organic solvent having a complexing agent and/or a chelating agent dissolved therein. Non-limitative examples of some suitable solvents include alcohols, ketones, aldehydes, mixtures thereof, and/or the like. It is believed that the complexing agent may bind to the metal of the unexposed portion 20, thereby making it soluble in the removal solvent. In a non-limitative example, 2,4-pentanediketone is used as the complexing agent. Other organic complexing agents, such as monoethanolamine, diethanolamine, diketonates, dialkylamines, ethylaminediamine, ethylenediaminetetraacetic acid, salts thereof, and the like may be used. Still other complexing agents include betadiketonates such as acetylacetonate, pentanediketone, mixtures thereof, and/or the like; and/or carboxylic acids such as acetic acid, oxalic acid, 2-ethylhexanoic acid, formic acid, propionic acid, citric acid, acrylic acid, tartaric acid, mixtures thereof, and/or the like. Still further, inorganic anions such as cyanide and perchlorate may be used in the removal solvent. Without being bound to any theory, it is further believed that the use of such a complexing agent will not substantially remove metals in the zero oxidation state. In addition, the complexing agent will have little or no affect on other condensed oxides. It is to be understood that the selectivity of this removal technique advantageously allows for the direct stacking of oxide layers, substantially without deleterious effects to the lower layers.

After removal of the unexposed portions 20, further heating may be used to complete the conversion to the oxide film 10. The additional heating may be accomplished by conventional bulk heating if the substrate is able to withstand the thermal conditions, otherwise, laser annealing may be used to minimize diffusion of heat into the substrate, for example, a low temperature substrate like plastic. It is to be understood that the laser wavelength may be selected, in part, such that the plastic or other low temperature substrate will not absorb the laser light.

Embodiments of the method may optionally include further heating the patterned metal oxide film 10 to alter its physical, chemical, or electrical properties, and combinations thereof. Heating may be accomplished by annealing the film 10 in the presence of an oxidizing or a reducing gas. In a non-limitative example, the patterned metal oxide film 10 is about 100 nm thick, and heating such thin layer(s) in the presence of an oxidizing or reducing gas may result in diffusion and a change in the defect structure of the oxide film 10. Further, heating may alter the film's electrical properties to those desired for electronic circuitry, structures, devices 100, or combinations thereof.

Embodiment(s) of the patterned metal oxide film 10 may be used in a variety of ways. In one non-limitative example, an embodiment of the patterned metal oxide film 10 (made according to an embodiment of the method(s) disclosed herein) has metal contacts established thereon. Deposition techniques that may be used for establishing the metal contacts include, but are not limited to, various printing techniques (non-limitative examples of which include inkjet or screen printing, etc.), evaporating, sputtering, micro contact printing, and the like. The film 10 with the metal contacts may then be operatively disposed in a device 100.

In a second non-limitative example, the patterned metal oxide film 10 may be operatively disposed in a device, wherein the patterned metal oxide film includes at least one of a conducting oxide, a transparent conducting oxide, a semiconducting oxide, a transparent semiconducting oxide, a dielectric oxide, a transparent dielectric oxide, an insulator, and combinations thereof.

Figure 2:
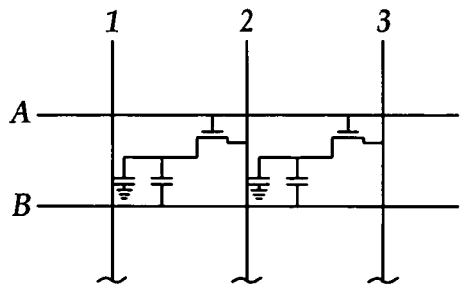
FIG. 2 is a schematic view of an embodiment of a device incorporating an embodiment of the patterned metal oxide film.
Figure 2A:
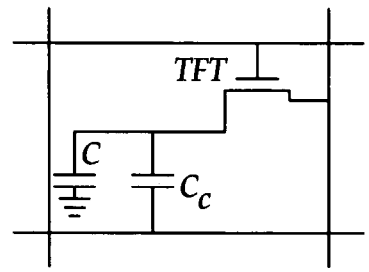
FIG. 2A is an enlarged schematic view of a portion of the device shown in FIG. 2.

FIGS. 2 and 2A illustrate an embodiment of a display device 100, and an enlarged view of a portion of that device 100. The thin film transistor (TFT), charge capacitor ($C_C$), and/or the data lines may have components (non-limitative examples of which include semiconductors, dielectrics, and conductors) that contain patterned metal oxide films 10 made according to embodiment(s) of the method disclosed herein. The capacitor (C) may be a liquid-crystal based pixel element. Each pixel may be addressed by applying a voltage to the desired row (labeled A and B) and column (labeled 1, 2, 3). It is to be understood that voltage-driven pixel technologies, such as LCD (liquid crystal display), have current flowing from the switch, which charges a capacitor ($C_C$) to apply an electrical field to liquid crystalline material.

To further illustrate embodiment(s) of the present disclosure, the following examples are given. It is to be understood that these examples are provided for illustrative purposes and are not to be construed as limiting the scope of the disclosed embodiment(s).

EXAMPLE 1

A Zn—Sn—O sol-gel precursor solution is jetted onto a substrate surface. The solution is dried to form the gel layer. The gel layer is heated via an external source at 80° C. and selectively exposed to a laser fluence of 5 mJ/cm² and 10 laser pulses. After exposing certain portions to laser irradiation, non-exposed portions are dissolved in a 2,4-pentanediketone/methanol solution at an appropriate composition and temperature until the unexposed material is removed.

EXAMPLE 2

A substrate of highly p-type doped silicon wafer with a tantalum/gold layer disposed on one side performed as the gate. A thermally grown oxide layer (acting as the gate dielectric) was grown to a thickness of 100 nm on a side of the substrate opposed the side having the tantalum/gold layer thereon. A blanket layer of sol-gel was deposited on the thermally grown oxide layer. The sol-gel was partially annealed through a shadow mask using an excimer laser. The sample was then immersed in a solution of 20% pentanediketone in methanol for about three minutes. The solution dissolved away the unexposed sol-gel material. The sample was then further annealed in a tube oven to 500° C. in air. Titanium source and drain electrodes were then evaporated onto the edges of the semiconductor layer through a shadow mask.

Figure 3:
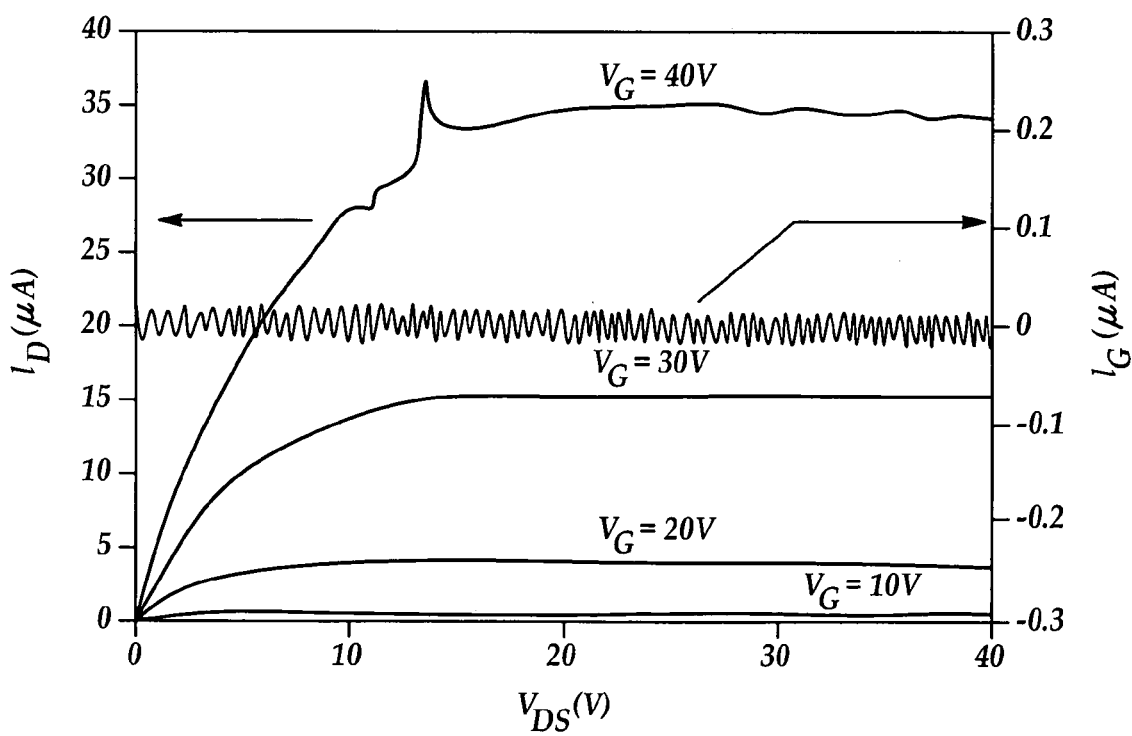
FIG. 3 is a graph depicting $I_D$-$V_D$ curves of an embodiment of a transistor formed using an embodiment of the method.

FIG. 3 illustrates the $I_D$-$V_D$ curves of the transistor formed in Example 2. The curves were measured using a semiconductor parameter analyzer. The drain current, $I_D$, (shown at the line corresponding to the left hand arrow) was measured by sweeping the drain-source voltage ($V_{DS}$) from 0 to 40V at a fixed gate voltage ($V_G$). The gate voltage was applied from 0 to 40V in 10V increments. The corresponding gate current, ($I_G$), (shown at the line corresponding to the right hand arrow) was essentially zero, indicating that the rise in drain current with gate voltage is a genuine field effect and likely not a result of gate leakage current. The mobility extracted from the $I_D$-$V_G$ data was 0.17 cm²/Vs, with an on/off ratio of 2×10³ and a turn on voltage of 3V.

EXAMPLE 3

The substrates were composed of conductive silicon with a tantalum/gold layer disposed on one side and a 1000 angstrom thick thermally grown oxide layer disposed on the other side. A solution of 0.1 M zinc isopropoxide and 0.1 M tin t-butoxide in isopropanol was thermally ink jetted twice onto the oxide surface of the substrate, with an 80° C./15 second anneal after each coat. The samples were laser treated with 10 pulses of 5 mJ fluence while heated on a hot plate at 80° C. The samples were then immersed in a 10% 2,4-pentane diketone, 90% methanol solution at 40° C. for about 10 seconds. The unexposed area was removed by the solution. The patterned substrates were then annealed in a tube furnace at 550° C. in air for one hour. Source and drain contacts, composed of 3000 angstroms of titanium, were evaporated across the Zn—Sn—O channels.

Figure 4:
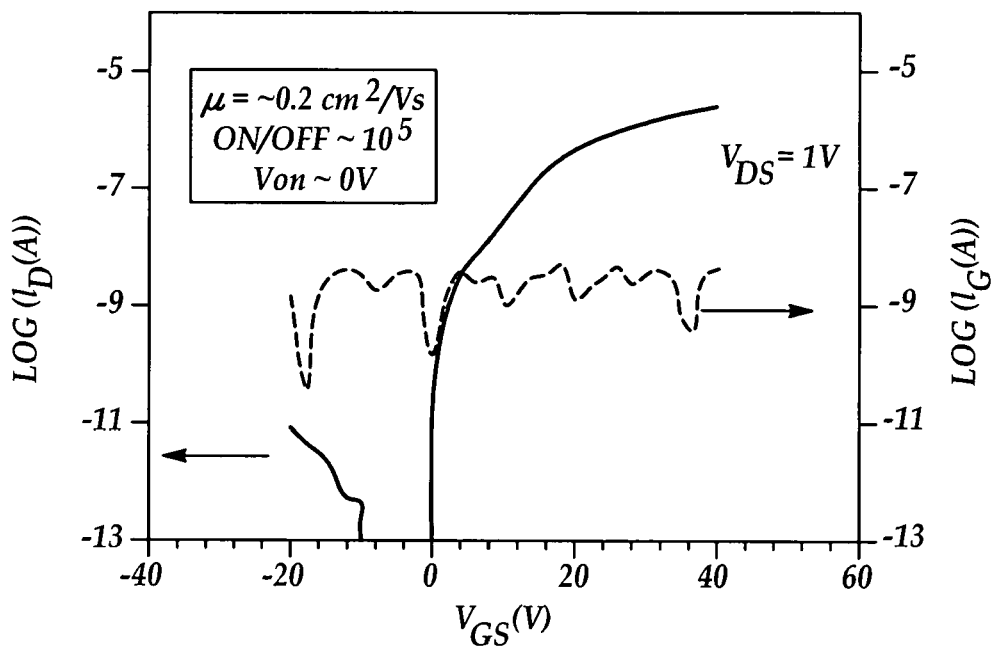
FIG. 4 is a graph depicting $I_D$-$V_G$ curves of an embodiment of a semiconductor formed using an embodiment of the method.
Figure 5:
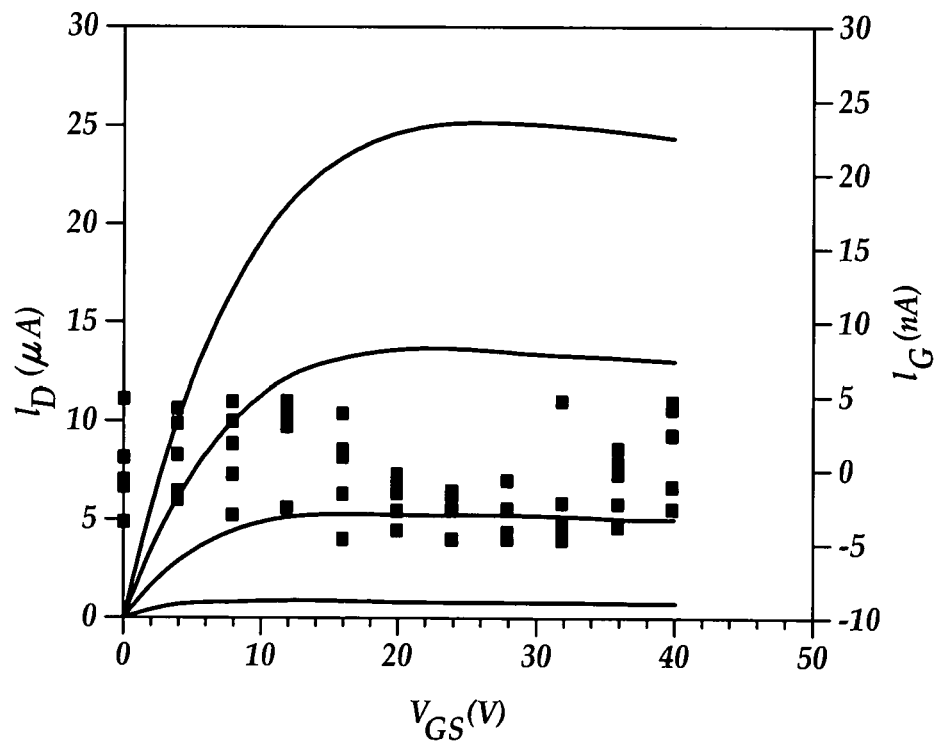
FIG. 5 is a graph depicting $I_D$-$V_D$ curves of an embodiment of a semiconductor formed using an embodiment of the method.

FIGS. 4 and 5 illustrate the $I_D$-$V_G$ and $I_D$-$V_D$ curves of the semiconductor formed in Example 3. The curves were measured using a semiconductor parameter analyzer. The electrical testing data revealed that the Zn—Sn—O showed a field effect (acting like a transistor) and had a mobility of 0.2 cm²/Vs.

Embodiment(s) of the method(s) as disclosed herein include, but are not limited to the following advantages. The creation of patterned metal oxide films 10 from an irradiation-patterned gel may substantially increase the design freedom for making electronic circuits. Without being bound to any theory, it is believed that since the material is irradiation-patterned, materials below the oxide film 10 will not be significantly exposed to high annealing temperatures during patterning, which may otherwise undesirably damage such materials. Additionally, the use of laser irradiation may allow the use of a polymer substrate that does not absorb in the wavelength range used, which may not handle the high temperatures used in oxide thermal annealing. Still further, the use of an organic solvent for removing unexposed portions 20 substantially prevents the use of acid solutions that may etch or dissolve other materials. The method(s) disclosed herein may also advantageously be performed at lower costs since vacuum and lithographic processes are, generally, not used. Finally, very precise features (non-limitative examples of which include those down to about 0.05 µm) may be formed repeatedly without the potential difficulties involved in other patterning methods. As the patterning and annealing may be combined in the method(s) disclosed herein, manufacturing steps may be eliminated.

While several embodiments have been described in detail, it will be apparent to those skilled in the art that the disclosed embodiments may be modified. Therefore, the foregoing description is to be considered exemplary rather than limiting.

What is claimed is:

1. A method of making a patterned metal oxide film, the method comprising:
   jetting a sol-gel solution on a substrate, the sol-gel solution consisting essentially of a metal alkoxide in an anhydrous solvent;
   hydrolyzing the sol-gel solution;
   drying the sol-gel solution to form a gel layer on the substrate;
   irradiating portions of the gel layer to pattern the gel layer and form exposed portions, whereby the exposed portions of the gel layer are at least one of substantially condensed to an oxide, substantially densified, substantially cured, and combinations thereof; and
   removing unexposed portions of the gel layer, thereby forming the patterned metal oxide film.

2. The method as defined in claim 1 wherein the anhydrous solvent is an alcohol.

3. The method as defined in claim 1, further comprising heating the patterned metal oxide film after removing the unexposed portions of the gel, thereby altering at least one of a physical property, a chemical property, and an electrical property of the patterned metal oxide film.

4. The method as defined in claim 3 wherein heating is accomplished by annealing in the presence of one of oxidizing and reducing gases.

5. The method as defined in claim 1 wherein after jetting and hydrolyzing the sol-gel solution, the method further comprises further hydrolyzing and condensing the sol-gel solution by exposing the sol-gel solution to at least one of water vapor and water vapor in ambient air.

6. The method as defined in claim 1 wherein removing the unexposed portions of the gel layer is accomplished by dissolving the unexposed portions of the gel layer in an organic solvent.

7. The method as defined in claim 6 wherein the organic solvent has at least one of a metal chelating agent, a complexing agent, and mixtures thereof, dissolved therein.

8. The method as defined in claim 7 wherein the complexing agent is 2,4-pentanediketone.

9. The method as defined in claim 1 wherein drying is accomplished at a temperature ranging between about 25° C. and about 130° C.

10. The method as defined in claim 1 wherein drying is accomplished at a temperature of about 80° C. for about two minutes.

11. The method as defined in claim 2 wherein prior to jetting the sol-gel solution, the method further comprises:
   mixing the alkoxide in the alcohol to form the solution; and
   refluxing the solution;
   wherein the mixing and refluxing substantially prevent water from contacting the solution.

12. The method as defined in claim 11 wherein the alkoxide is at least one of substantially homogeneously and substantially heterogeneously mixed in the alcohol.

13. The method as defined in claim 1 wherein irradiating is accomplished by:
   shadow masking a predetermined portion of the gel layer to form the exposed portions and the unexposed portions; and
   exposing the gel layer to a light source.

14. The method as defined in 13 wherein the light source is ultraviolet light.

15. The method as defined in claim 1 wherein irradiating is accomplished by focusing optics forming a beam on the exposed portions of the gel layer.

16. The method as defined in claim 1 wherein jetting the sol-gel solution is accomplished by at least one of continuous inkjet printing and drop on demand inkjet printing.

17. The method as defined in claim 1, further comprising heating the gel layer simultaneously with irradiating the portions of the gel layer.

18. The method as defined in claim 17 wherein heating takes place at a temperature of about 80° C.

19. The method as defined in claim 1 wherein the patterned metal oxide film includes features having a width greater than about 2.5 µm.

20. The method as defined in claim 1 wherein the substrate is at least one of silicon, single crystal silicon, polycrystalline silicon, silicon oxide containing dielectric substrates, alumina, sapphire, ceramic, cermets, metals, glass, polymers, and mixtures thereof.

21. The method as defined in claim 1 wherein prior to jetting the sol-gel solution on the substrate, the method further comprises establishing a thermally grown oxide layer on the substrate.

22. The method as defined in claim 21 wherein the thermally grown oxide layer is about 1000 angstroms thick.

23. The method as defined in claim 1 wherein the metal in the metal alkoxide is selected from aluminum, arsenic, antimony, bismuth, barium, beryllium, boron, calcium, cadmium, cerium, cesium, chromium, cobalt, copper, europium, gadolinium, gallium, germanium, hafnium, holmium, iron, indium, lanthanum, lead, lithium, manganese, neodymium, niobium, nickel, potassium, platinum, palladium, praseodymium, rubidium, rhodium, ruthenium, sodium, selenium, strontium, scandium, tantalum, titanium, tin, tellurium, terbium, thorium, vanadium, ytterbium, zirconium, zinc, and mixtures thereof.

24. A method of making a patterned metal oxide film, the method comprising:
   forming a sol-gel solution outside the presence of water, the sol-gel solution consisting essentially of a metal alkoxide in an anhydrous solvent;
   jetting the sol-gel solution on a substrate;
   drying the sol-gel solution to form a gel layer on the substrate;
   irradiating portions of the gel layer to pattern the gel layer and form exposed portions, whereby the exposed portions of the gel layer are at least one of substantially condensed to an oxide, substantially densified, substantially cured, and combinations thereof; and
   removing unexposed portions of the gel layer, thereby forming the patterned metal oxide film.

* * * * *

UNITED STATES PATENT AND TRADEMARK OFFICE
CERTIFICATE OF CORRECTION

| | |
|---|---|
| PATENT NO. | : 7,381,633 B2 |
| APPLICATION NO. | : 11/044424 |
| DATED | : June 3, 2008 |
| INVENTOR(S) | : John O. Thompson et al. |

Page 1 of 1

It is certified that error appears in the above-identified patent and that said Letters Patent is hereby corrected as shown below:

In column 3, line 15, delete "salvation" and insert -- solvation --, therefor.

In column 10, line 12, in Claim 14, delete "13" and insert -- claim 13 --, therefor.

Signed and Sealed this

Fourth Day of November, 2008

JON W. DUDAS
*Director of the United States Patent and Trademark Office*